United States Patent [19]
Chbat et al.

[11] Patent Number: 6,122,840
[45] Date of Patent: Sep. 26, 2000

[54] SYSTEMS AND METHODS FOR DETERMINING DRYING TIME FOR A CLOTHES DRYER

[75] Inventors: Nicolas Wadih Chbat, Albany; Vivek Venugopal Badami, Schenectady, both of N.Y.

[73] Assignee: General Electric Company, Schenectady, N.Y.

[21] Appl. No.: 09/195,096

[22] Filed: Nov. 18, 1998

[51] Int. Cl.[7] .................................................. F26B 3/00
[52] U.S. Cl. .............................. 34/496; 34/499; 34/535; 34/562
[58] Field of Search ............................ 34/493, 494, 496, 34/497, 488, 499, 446, 535, 491, 495, 562; 68/12.01, 12.02, 12.05

[56] References Cited

U.S. PATENT DOCUMENTS

| | | | |
|---|---|---|---|
| 4,206,552 | 6/1980 | Pomerantz et al. | 34/23 |
| 4,481,786 | 11/1984 | Bashark | 62/160 |
| 4,607,408 | 8/1986 | Didier et al. | 8/159 |
| 4,733,479 | 3/1988 | Kaji et al. | 34/31 |
| 4,835,991 | 6/1989 | Knopp et al. | 68/12 |
| 4,862,710 | 9/1989 | Torita et al. | 68/12 |
| 5,042,276 | 8/1991 | Kamano et al. | 68/12.04 |

(List continued on next page.)

FOREIGN PATENT DOCUMENTS 0345120 of 0000 European Pat. Off. .

OTHER PUBLICATIONS

"Intelligent Dishwasher Outsmarts Dirt", Andrea Baker, Associate Editor, Design News, Apr. 10, 1995, pp. 67–73.
"Decision–Making in a Fuzzy Environment", R. E. Bellman and L. A. Zadeh, Management Science, vol. 17, No. 4, Dec. 1970, pp. B–141–B–165.
"It washes! It Rinses! It Talks!", Lawrence A. Berardinis, Senior Editor, Machine Design, Sep. 12, 1991, pp. 43–47.
"State–of–th–Art in Household Appliances Using Fuzzy Logic", Alanna Quali and Adnan Shaout, University of Michigan, Dept. of Electrical and Computer Engineering – pp. 204–213.
"Sensor Appliance control, and Fuzzy Logic", Michael Larence Smith, IEEE Transactions on Industry Applications, vol. 30, No. 2, Mar./Apr. 1994, pp. 305–310.
"Introduction to Japanese Consumer Products that Apply Neural Networks and Fuzzy Logic", Hideyuki Takagi, University of California at Berkeley, Computer Science division, pp. 1–8.
"Fuzzy Logic–Based Supervisory Control of Household Appliances", Vivek V. Badami, IEEE, Apr. 1997, pp. 213–217.
"ANFIS: Adaptive–Network–based Fuzzy Inferencing Systems", *IEEE Transactions on Systems, Man and Cybernatics*, vol. 23, No. 3, May 1993, pp. 665–685.
Copending U.S. Patent application Ser. No. 08/968,732, filed Nov. 12, 1997, by Vivek V. Badami, entitled "Appliance Performance Control Apparatus and Method".

*Primary Examiner*—Stephen Gravini
*Assistant Examiner*—Michelle A. Mattera
*Attorney, Agent, or Firm*—Donald S. Ingraham; Douglas E. Stoner

[57] ABSTRACT

A clothes dryer includes a control system for determining the drying time for a partial load in a clothes dryer. The system includes a humidity sensor, a signal processor, and a fuzzy logic control system. The humidity sensor generates a humidity signal representative of the humidity of air flowing through the trap duct. The humidity sensor transmits the humidity signal to the signal processor, and the signal processor determines a drying span utilizing the humidity signal. The fuzzy logic control system then utilizes the drying span to estimate the clothes load.

19 Claims, 4 Drawing Sheets

U.S. PATENT DOCUMENTS

| | | | |
|---|---|---|---|
| 5,161,393 | 11/1992 | Payne et al. | 68/12.04 |
| 5,208,931 | 5/1993 | Williams et al. | 8/159 |
| 5,230,228 | 7/1993 | Nakano et al. | 68/12.04 |
| 5,233,847 | 8/1993 | Tanaka | 68/12.04 |
| 5,241,845 | 9/1993 | Ishibashi et al. | 68/12.02 |
| 5,284,523 | 2/1994 | Badami et al. | 134/18 |
| 5,291,626 | 3/1994 | Molnar et al. | 8/158 |
| 5,313,964 | 5/1994 | Dausch et al. | 134/57 |
| 5,330,580 | 7/1994 | Whipple, III et al. | 134/18 |
| 5,347,727 | 9/1994 | Kim | 34/491 |
| 5,570,520 | 11/1996 | Huffington | 34/535 |
| 5,577,283 | 11/1996 | Badami et al. | 8/158 |
| 5,600,310 | 2/1997 | Whipple, III et al. | 340/825.06 |
| 5,600,961 | 2/1997 | Whipple, III | 62/175 |
| 5,647,231 | 7/1997 | Payne et al. | 68/12.01 |
| 5,669,095 | 9/1997 | Dausch et al. | 8/158 |
| 5,669,250 | 9/1997 | Dausch et al. | 68/12.02 |
| 5,899,005 | 5/1999 | Chen et al. | 34/528 |

Humidity Vs. Drying Time For Different Loads

Span 2.3e+003

Load

SYSTEMS AND METHODS FOR DETERMINING DRYING TIME FOR A CLOTHES DRYER

FIELD OF THE INVENTION

This invention relates generally to drying machines for drying clothes and, more particularly, to determining the drying time for a particular load.

BACKGROUND OF THE INVENTION

Conventional clothes drying machines typically utilize an open loop control system to determine an appropriate amount of time for drying a load of clothes. The duration of drying time is determined by an operator and entered using a manual control, such as a time selector switch. The operator selects a drying time based on the desired dryness for the clothes and based on past experience with the particular machine. A longer drying time than is necessary to fully dry the clothes commonly is selected to ensure that the clothes are fully dried. Use of more time than is needed for effective drying, however, leads to a waste of energy.

To more accurately determine appropriate drying times, some known clothes drying machines include closed loop control systems. Such closed loop control systems typically include humidity sensors, temperature sensors, or both, that are used in conjunction with look up tables to estimate the weight of the load. Particularly, the length of drying time required is a function of the weight of the load and the amount of water contained in the load. By estimating the weight of the load, and knowing the temperature or humidity (or both) at selected locations in the machine, the length of drying time can be estimated.

Although such closed loop systems are useful, it would be desirable to increase the accuracy of such systems. In increasing the accuracy of such systems, it also would be desirable to minimize additional sensor cost. Increasing the accuracy of such systems without adding significant sensor costs results in savings to the consumer in the form of reduced energy consumption.

BRIEF SUMMARY OF THE INVENTION

A clothes dryer that is configured to optimize drying times comprises a closed loop fuzzy logic control for determining drying time. In one embodiment, a first subsystem uses drying span to determine the load in the dryer and the second subsystem determines the additional drying time required based on the load size estimation from the first subsystem. To determine the drying span, a humidity sensor is positioned to sense the humidity of air flowing through the dryer trap duct, and the sensor transmits a humidity signal to a signal processor that determines the drying span in correspondence with the humidity signal. The fuzzy logic control system utilizes the drying span to estimate desired drying parameters and to stop the dryer when the clothes reach the desired dryness level.

DETAILED DESCRIPTION

The present invention is not limited to practice in any one specific type of clothes dryer, and it is contemplated that the invention can be used with a wide variety of clothes dryers. Exemplary clothes dryers in which the present invention can be used are commercially available, for example, from General Electric Company, Appliance Park, Louisville, Ky., and such commercially available dryers can be adapted to include a clothes load determining system constructed in accordance with the present invention.

The closed loop fuzzy logic control system of the present invention provides an estimation of drying time without significantly increasing the sensor cost of common clothes dryers. Particularly, the control system is adapted to use sensors commonly found in laundry dryers, thus enabling use of the control system without incurring additional sensor cost. In addition, the control system is believed to provide energy savings in operation of a clothes dryer.

Figure 1:
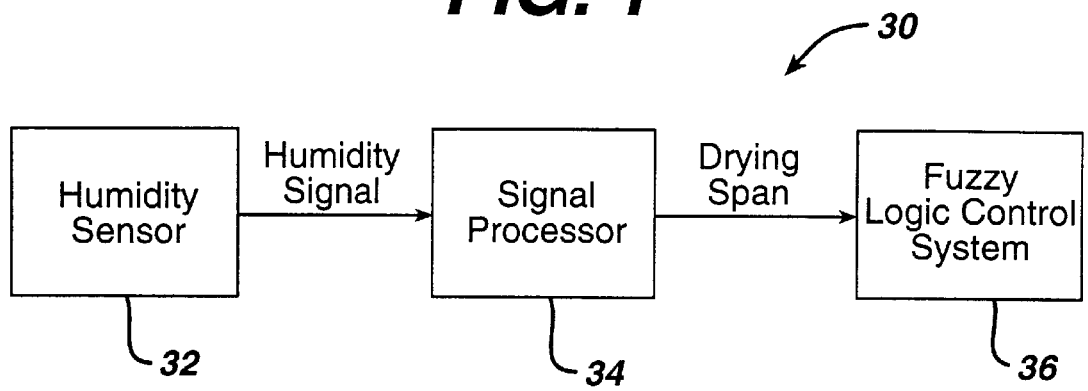
FIG. 1 is a box diagram of a clothes load determining system in accordance with one embodiment of the present invention.

FIG. 1 is a box diagram of a clothes load determining system 30 in accordance with one embodiment of the present invention. System 30 includes a humidity sensor 32, a signal processor 34, and a fuzzy logic control system 36. Humidity sensor 32 is located, for example, at a trap duct of the dryer, and generates a signal representative of the humidity of air flowing through the trap duct. Humidity sensors are generally known in the art, and the present invention is not limited to practice with any one particular humidity sensor.

Humidity sensor 32 is electrically coupled, and transmits a humidity signal, to signal processor 34. Signal processor 34 is adapted to determine a drying span utilizing the humidity signal, as described below, and signal processor 34 is coupled to fuzzy logic control system 36. As used herein, "adapted to", "configured" and the like refer to computational devices (such as programmable computing devices and application specific integrated circuits, or the like), that are programmed with algorithms to provide a computational processing of signals applied to the device. Fuzzy logic control system 36 utilizes the drying span determined by processor 34 to estimate the remaining drying time for a particular clothes load.

Figure 2:
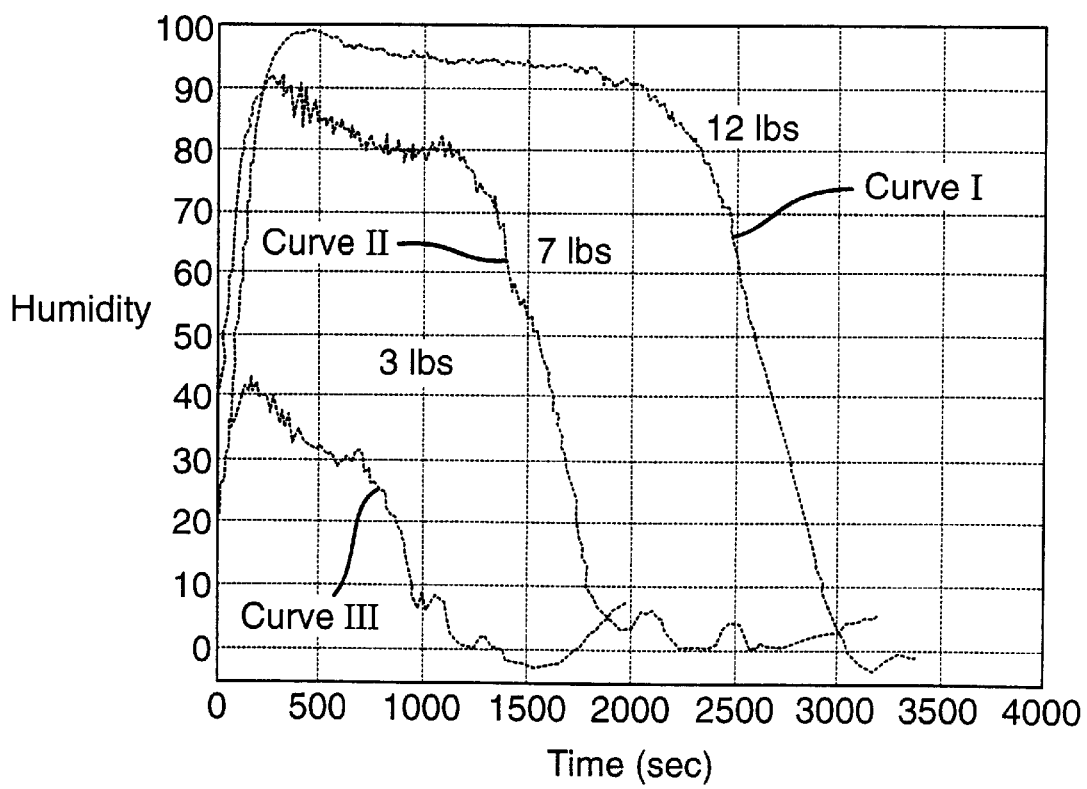
FIG. 2 is a graphical illustration of humidity signals generated for three different clothes loads.

With respect to determining the drying span from the humidity signal, FIG. 2 is a graphical illustration of humidity signals generated by sensor 32 for three exemplary clothes loads. Curve I represents a humidity signal generated for a twelve pound clothes load. Curve II represents a humidity signal generated for a seven pound clothes load. Curve III represents a humidity signal generated for a three pound clothes load. Each humidity signal is indicative of the percent relative humidity of air flowing through the trap duct during operation of the clothes dryer for a given load (e.g., the three pound load, the seven pound load, or the twelve pound load).

The drying span for each load refers to the interval of time for sufficient moisture to be removed from the articles so that they are dried to desired level of "dryness," which is typically selected by the operator (that is, the operator may select that the clothes have some residual moisture at the end of the drying cycle). Determination of the drying span typically is accomplished by sensing the humidity of air flowing through the trap duct during operation of the clothes dryer. Particularly, the drying span is the interval of time between a sensed increase in the humidity of air flowing through the trap duct (indicating the start of the drying cycle) and a predetermined decrease (corresponding to the desired end point of the drying cycle, leaving the clothes with the selected level of "dryness") in the humidity of air flowing through the trap duct.

For example, and referring specifically to Curve I, at the beginning of clothes dryer operation, humidity sensor 32 generates a humidity signal having an initial value which is representative of the initial humidity of air flowing through the trap duct. For a first interval of time of clothes dryer operation, the humidity of air flowing through the trap duct increases compared to the initial value. For a subsequent second interval of time, the humidity of air flowing through the trap duct decreases in a substantially linear manner. After the second interval of time, the humidity quickly falls, or decreases, to about zero humidity. The drying span is the sum of the first and second intervals, i.e., from time zero (start of the drying cycle) to the end of the second time interval.

Of course, the exact point on the humidity curve designated as the end of the second interval is selected (e.g., by operator input or, alternatively, part of a pre-programmed nominal drying cycle). For example, the point for the end of the second interval is typically a selected percentage of the maximum detected humidity, such as the point at which the measured humidity is approximately about 70% of the maximum detected humidity. Other percentages can, of course, be utilized.

To determine the drying span, signal processor 34 includes a time counter which keeps track of elapsed time between the initiation of machine operation and the end of the second interval of time (based on the inputs supplied by humidity sensor 32). Processor 34 determines the drying span as described above, and then supplies the span information to fuzzy logic control system 36.

Fuzzy logic control system 36 includes, in one embodiment, a microcontroller programmed to perform fuzzy logic operations. More particularly, system 36 includes two inference subsystems. A first subsystem determines, from the measured span, the clothes load. The load size is determined, for example, by defining the degree of membership in the fuzzy classes (i.e., "tiny", "small", "medium", and "big"). A second subsystem then uses the load estimate to determine how much additional drying time should be utilized.

Figure 3A:
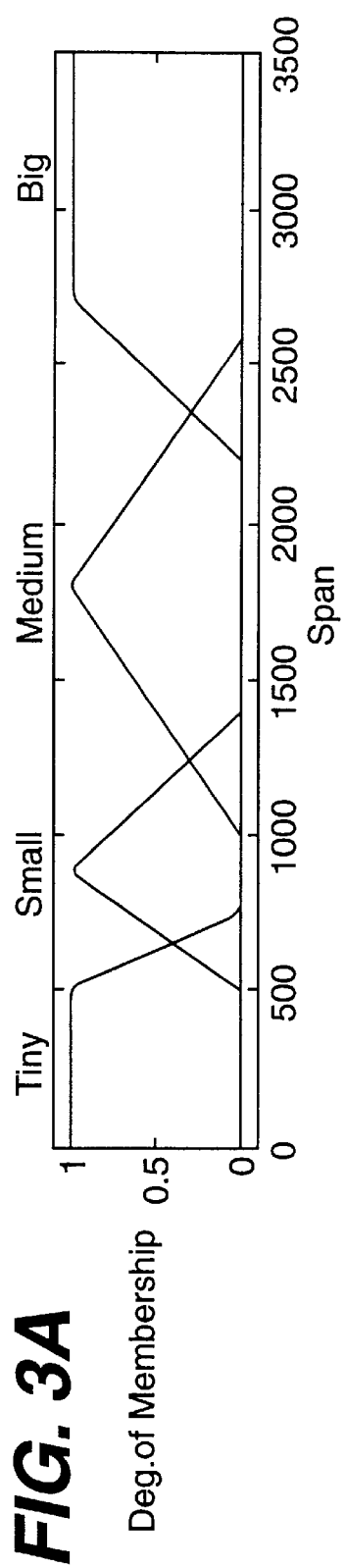
FIGS. 3A, 3B, and 3C illustrate membership functions of the fuzzy inference systems.
Figure 3B:
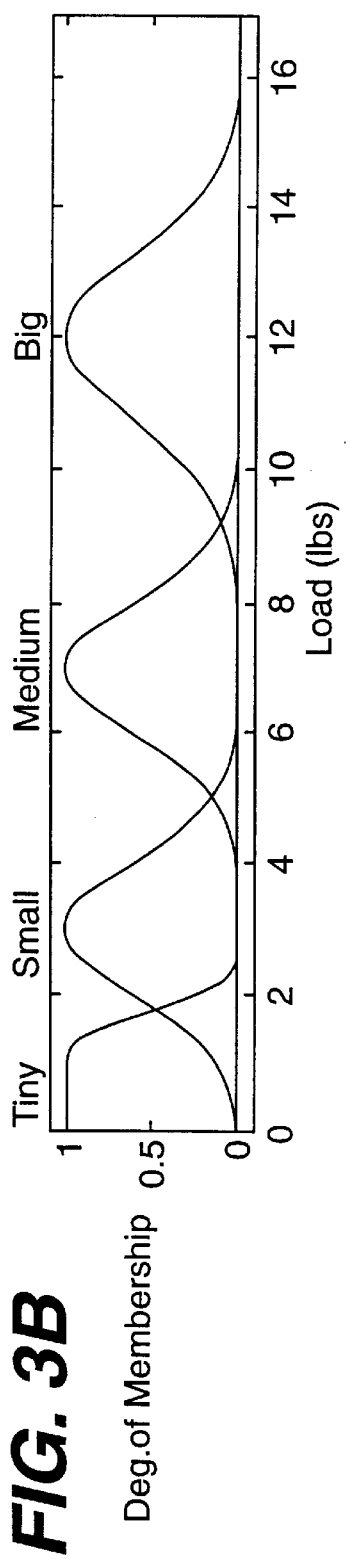
Figure 3C:
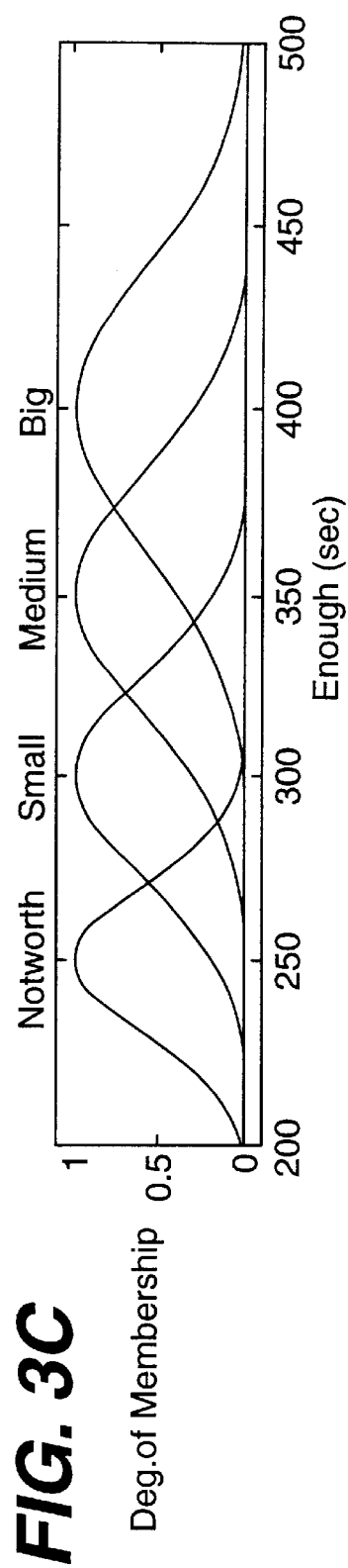

FIGS. 3A, 3B, and 3C illustrate plots for membership functions of the fuzzy inference subsystems. The first fuzzy inference subsystem, as explained above, receives the measured span as input and determines the load, which is described the fuzzy classes "tiny", "small", "medium", and "large (or big)". Exemplary rules for the first subsystem are set forth below:

Rule 1: if the determined drying span is "tiny", then the clothes load either is "tiny" or is "dry"

Rule 2: if the determined drying span is "small", then the clothes load is "small"

Rule 3: if the determined drying span is "medium", then the clothes load is "medium"

Rule 4: if the determined drying span is "large", then the clothes load is "large".

There is some overlap between respective fuzzy sets for particular spans, which reflects the uncertainty associated with, for example, tiny loads that are very wet (at the outset) and small loads that are somewhat dry (at the outset).

More particularly, the first subsystem receives, as input, the measured span. As shown in FIG. 3A, the measured span can then be used to determine the degree of membership in each fuzzy class. Using this information, the first subsystem estimates the size of the load in accordance with the plots set forth in FIG. 3B.

Using the size of the load as determined from the drying span, the first subsystem further estimates the clothes load (expressed in weight of the clothes), as represented for example in FIG. 3B. Using the degree of membership in the respective fuzzy sets for load size, the second fuzzy inference subsystem then determines the remaining time required for drying. A graphical illustration of the relationship between the degree of membership in the respective fuzzy sets and the time remaining for drying also is set forth in FIG. 3C.

Figure 4A:
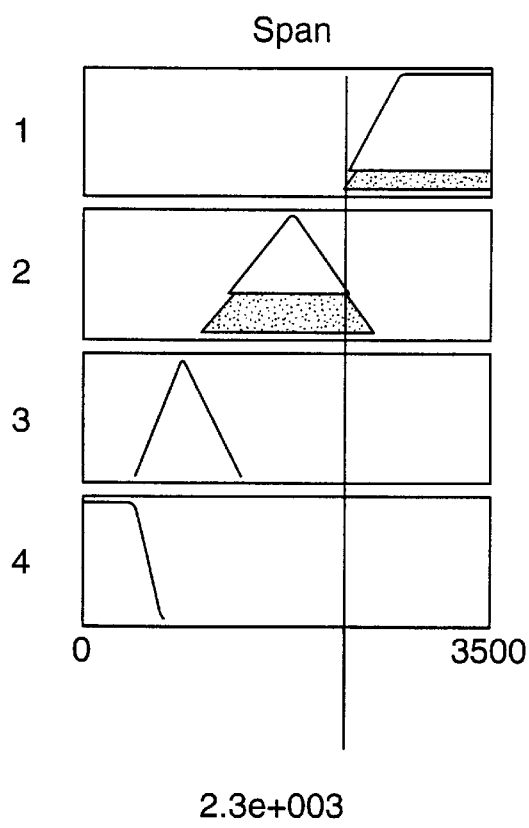
FIGS. 4A and 4B are rule viewers illustrating a specific example of load determination.
Figure 4B:
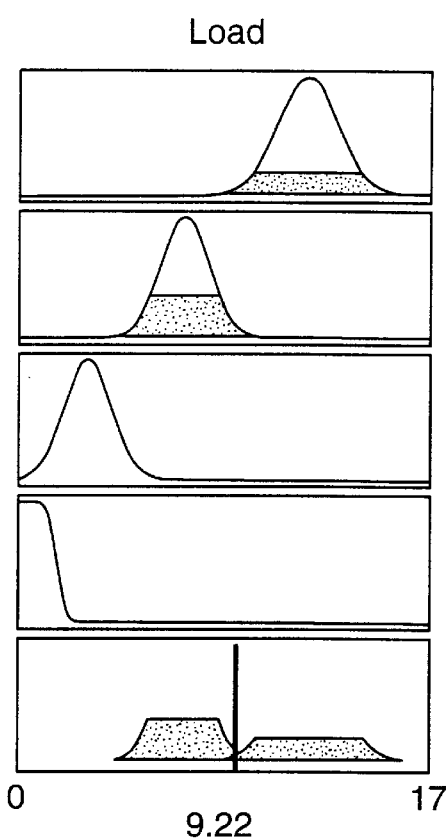

FIGS. 4A and 4B are rule viewers illustrating one specific operation of the first subsystem. The rule viewer shown in FIG. 4A represents the span time fuzzy classes with view 1 being the "big" domain, view 2 being the "medium" domain, view 3 being the "small" domain, and view 4 being the "tiny" domain. By way of example and not limitation, an exemplary span time measured by processor 34 is 2.3e+003 seconds, which exemplary span time is illustrated in FIG. 4A with shading as having a degree of membership in both the "big" and "medium" fuzzy sets. The shaded area in each fuzzy set shown in FIG. 4A graphically represents the degree of membership of this particular span in the set as determined by the first fuzzy subsystem.

Using the span information generated, the first fuzzy subsystem generates a crisp value of the load. The shaded area illustrated in view 1 through 4 of FIG. 4B in each fuzzy set represents the degree of belonging that the "span" determination imparts as the "load" fuzzy sets. In this example, the load has no membership in the tiny and small sets, but does have some degree of membership in the big and medium sets.

To determine the size of the load, the geometric center of the summed shaded area is determined. Specifically, the membership functions are summed to provide a summed area (i.e., the shaded area in View 5 of FIG. 4B), and then the geometric center of the summation is determined. In this specific example, the geometric center corresponds to 9.22 pounds. Once the load is determined, then a look-up table stored in system 36 can be used to provide an estimate as to the remaining time required to dry the load. Rather than a look-up table, fuzzy logic, a linear equation, or a system having a combination of such processing means, can be used to determine the remaining time required to dry the load.

Many alternatives to the embodiments described above are possible. For example, in an alternative embodiment, signal processor 34 is configured to determine drying span as a duration of time between the start of the drying cycle and the time at which the slope of the humidity signal becomes zero. More particularly, and referring again to Curve I in FIG. 2, the slope of the humidity signal has a minimum value at approximately 3200 seconds. Accordingly, in this embodiment, the drying span for the twelve pound load is approximately 3200 seconds. Similarly, and referring to Curve II of FIG. 2, the slope of the humidity signal becomes a minimum value at approximately 2000 seconds. Accordingly, in this embodiment, the drying span for the seven pound load is approximately 2000 seconds. Referring to Curve III of FIG. 2, the slope of the humidity signal becomes a minimum value at approximately 1000 seconds, and the drying span for the three pound clothes load thus also is approximately 1000 seconds. This drying span can then be used to determine the degree of membership of the load in the respective fuzzy sets, so the additional drying time can then be determined as described above.

Use of a control system employing the fuzzy sets as described above provides the advantage that less expensive sensors can be used for sensing temperature and humidity since the fuzzy logic compensates for sensor imprecision. Rather than precise values, with the fuzzy logic based system, only approximate values are needed.

Figure 5:
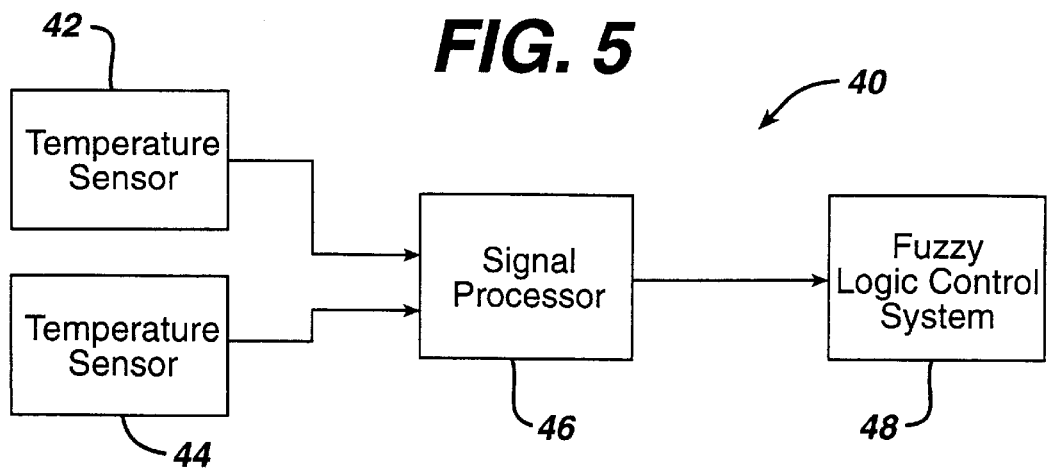
FIG. 5 is a schematic illustration of a clothes load determining system in accordance with another embodiment of the present invention.

FIG. 5 is a schematic illustration of a clothes load determining system 40 in accordance with yet another embodiment of the present invention. System 40 estimates clothes load utilizing temperature differences between the trap duct and the inside drum of a dryer, and includes a first temperature sensor 42, a second temperature sensor 44, a signal processor 46, and a fuzzy logic control system 48. First temperature sensor 42 is coupled to the trap duct and is configured to detect a temperature of air flowing through the trap duct during clothes dryer operation. Similarly, second temperature sensor 44 is coupled to the inside drum and is configured to detect a temperature inside the clothes dryer drum. Each temperature sensor 42 and 44 may, for example, comprise a thermocouple.

Temperature sensors 42 and 44 each are coupled to signal processor 46 so as to transmit temperature signals to signal processor 46. Each temperature signal is representative of the temperature at respective temperature sensors 42 and 44 during dryer operation. Signal processor 46 is configured to determine a difference between the temperatures sensed by first temperature sensor 42 and second temperature sensor 44, and utilizes the difference to identify a mean temperature difference value. Signal processor 46 transmits a signal representative of the mean temperature difference value to fuzzy logic control system 48. Fuzzy logic control system 48 utilizes the mean temperature difference value to generate a clothes load estimate signal for clothing in the clothes dryer. As described above, this estimate signal can then be employed in time determination subsystem, comprising for example a fuzzy inference system, a programmed algorithm, or alternatively a look up table, to determine the remaining time for drying.

Figure 6:
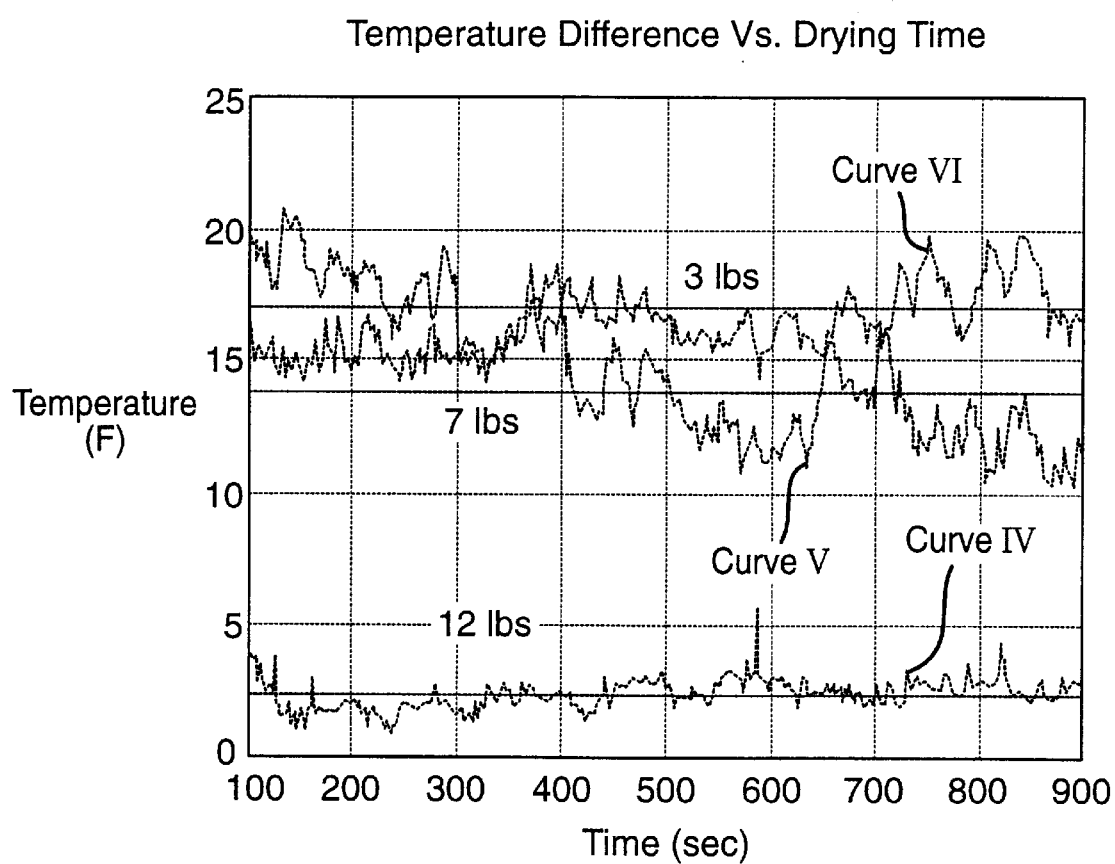
FIG. 6 is a graphical illustration of temperature difference values for three different clothes loads.

FIG. 6 is a graphical illustration of temperature difference values for three exemplary clothes loads. Curve IV represents a temperature difference for a twelve pound clothes load. Curve V represents a temperature difference for a seven pound clothes load. Curve VI represents a temperature difference for a three pound clothes load. Each curve illustrates temperature differences for a time span of 800 seconds. Other time spans, e.g., 700 seconds or 900 seconds, may be utilized. The time span may be preselected and stored, for example, in the memory (e.g., a read-only-memory (ROM)device) of signal processor 46.

The mean temperature difference value for each clothes load is determined utilizing the temperature difference through the entire time span. For example, and referring specifically to Curve IV, the mean temperature difference value for the twelve pound clothes load is approximately 2 degrees Fahrenheit. Referring specifically to Curve V, the mean temperature difference value for the seven pound clothes load is approximately 14 degrees Fahrenheit. Referring to Curve VI, the mean temperature difference value for the three pound clothes load is approximately 17 degrees Fahrenheit.

After determining the mean temperature difference value for a clothes load, signal processor 46 transmits such mean value to fuzzy logic control system 48, which utilizes the mean value to estimate the clothes load. Particularly, the mean temperature difference value is proportional to the clothes load. Fuzzy logic control system 48 is configured similarly to fuzzy logic control system 36 and estimates clothes load in accordance with the mean temperature difference value. Particularly, system 48 includes three inference subsystems identical to the subsystems of system 36 with the exception that in system 48, the first subsystem determines load size based on the mean temperature difference using the following rules: if the mean value is "small", then the clothes load is "large"; if the mean value is "medium", then the clothes load is "medium"; and if the mean value is "large", then the clothes load is "small". Using fuzzy sets similar to the fuzzy sets described in connection with system 30, except of course that mean temperature difference is substituted for drying span, the size of the load and the drying time are estimated.

The above-described systems are believed to provide estimates of required drying time without significantly increasing sensor costs. In addition, such systems are believed to facilitate energy savings in a dryer as compared to a dryer without the control system of the present invention.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A system for determining drying time in a clothes dryer, said system comprising:
a humidity sensor for generating a signal representative of the humidity of air flowing through a trap duct in the dryer;
a signal processor coupled to said sensor for receiving the humidity signal and configured to determine a drying span utilizing the humidity signal; and
a fuzzy logic control system coupled to said signal processor and configured to determine the drying time corresponding to said drying span.

2. A system in accordance with claim 1 wherein said fuzzy logic control system comprises a plurality of fuzzy inference subsystems.

3. A system in accordance with claim 2 wherein said fuzzy inference subsystems comprise a span based inference subsystem and a load based inference subsystem.

4. A system in accordance with claim 3 wherein said span based inference subsystem is adapted to provide a dryer load output value corresponding to membership in one or more of a plurality of fuzzy sets.

5. A system in accordance with claim 4 wherein said span based inference subsystem utilizes the drying span to determine a degree of membership in said sets.

6. A system in accordance with claim 1 wherein said drying span corresponds to an interval of time between a first humidity condition of air at said sensor and a second humidity condition of air at said sensor.

7. A clothes dryer comprising a system for determining drying time for a clothes load in said clothes dryer, the clothes dryer including a drum for holding clothes to be dried, an inside door and a trap duct, said system for determining drying time comprising:
a first temperature sensor disposed in a first location for transmitting a first signal representative of temperature inside said drum;

a second temperature sensor disposed in a second location for transmitting a second signal representative of temperature in said trap duct;

a fuzzy logic control system coupled to said first and second temperature sensor for receiving said respective temperature representative signals and configured to determine the clothes load in correspondence with a mean value of the temperature difference between said first and second temperature signals.

8. An apparatus in accordance with claim 7 further comprising a signal processor coupled between said first and second temperature sensors and said control system.

9. An apparatus in accordance with claim 8 wherein said signal processor is configured to determine said mean temperature difference value.

10. An apparatus in accordance with claim 8 wherein said signal processor is configured to determine a mean temperature difference value for a time span.

11. A method for determining drying time for a clothes load in a clothes dryer, the dryer including a humidity sensor for generating a signal representative of the humidity of air flowing through a trap duct in the dryer, said method comprising the steps of:

determining a drying span utilizing the humidity signal;

using a fuzzy logic controller for determining membership in fuzzy sets representing clothes load in correspondence to the drying span; and using said fuzzy logic controller, determining drying time as a function of the determined membership in fuzzy sets representing clothes load.

12. A method in accordance with claim 11 wherein to determine the drying span, said method further comprises the step of determining an interval of time between a first condition of humidity of air flowing through the trap duct and a second condition of humidity of air flowing through the trap duct.

13. A method in accordance with claim 11 wherein said step of determining a drying span further comprises the steps of:

determining an initial humidity value of the humidity signal; and determining an interval of time between an increase in humidity of air flowing through the trap duct with respect to the initial humidity value and a decrease in humidity of air flowing through the trap duct with respect to the initial humidity value.

14. A system in accordance with claim 1 wherein said fuzzy logic control system is adapted to determine drying span in correspondence with the slope of the humidity signal.

15. A clothes dryer comprising a system for determining drying time for a clothes load in said clothes dryer, the clothes dryer including a drum for holding clothes to be dried and a trap duct through which exhaust air passes from said drum, said system for determining drying time comprising:

a temperature module, said temperature module comprising at least a first temperature sensor disposed in a first location for transmitting a first signal representative of temperature inside said drum and at least a second temperature sensor disposed in a second location for transmitting a second signal representative of temperature in said trap duct, and a signal processor coupled to said first and second temperature sensors and adapted to generate a signal corresponding to the mean temperature difference between said first and second temperature signals;

a humidity module, said humidity module comprising at least one humidity sensor disposed to sense humidity of the exhaust air and a signal processor coupled to said humidity sensor and adapted to generate a signal corresponding to humidity of the exhaust air; and a fuzzy logic control system coupled to said temperature module and to said humidity module, said fuzzy logic control system further being configured to generate a clothes load signal corresponding to at least one of said mean temperature difference signal and said humidity signal, said control system further being configured to generate a drying time signal in correspondence with the determined clothes load signal.

16. The dryer of claim 15 wherein said humidity signal provided by said humidity module corresponds to the relative humidity of air exhausting from said drum.

17. The dryer of claim 15 wherein said humidity signal provided by said humidity module corresponds to the slope of the values of the relative humidity of air exhausting from said drum.

18. The dryer of claim 15 wherein said fuzzy logic control system comprises at least a load prediction subsystem and a drying time subsystem.

19. A method for determining drying time for a clothes load in a clothes dryer, the dryer including a drum holding clothes do be dried and a trap duct through which air exhausts from said drum, and a plurality of temperature sensors, said method comprising the steps of:

generating a first temperature signal corresponding to the temperature in said drum;

generating a second temperature signal corresponding to the temperature of the exhaust air from said drum;

generating a mean temperature difference signal representing the mean of temperature difference between said first and second temperature signal;

using a fuzzy logic controller for determining membership in fuzzy sets representing clothes load in correspondence with said mean temperature difference signal, and using said fuzzy logic controller for determining drying time as a function of the determined membership in fuzzy sets representing clothes load.

* * * * *